US011193612B2

(12) United States Patent
O'Neil (10) Patent No.: US 11,193,612 B2
(45) Date of Patent: Dec. 7, 2021

(54) NO-HUB PIPE COUPLING METHOD AND APPARATUS

(71) Applicant: Reliance Worldwide Corporation, Poway, CA (US)

(72) Inventor: Virgil O'Neil, Poway, CA (US)

(73) Assignee: Reliance Worldwide Corporation, Atlanta, GA (US)

( * ) Notice: Subject to any disclaimer, the term of this patent is extended or adjusted under 35 U.S.C. 154(b) by 248 days.

(21) Appl. No.: 16/569,337

(22) Filed: Sep. 12, 2019

(65) Prior Publication Data
US 2020/0088328 A1 Mar. 19, 2020

Related U.S. Application Data (60) Provisional application No. 62/731,624, filed on Sep. 14, 2018.

(51) Int. Cl.
*F16L 21/06* (2006.01)

(52) U.S. Cl.
CPC .................................... *F16L 21/06* (2013.01)

(58) Field of Classification Search
CPC ....... F16L 17/04; F16L 27/107; F16L 27/113; F16L 21/005; F16L 21/00; F16L 21/06; F16L 21/065; F16L 21/002; F16L 21/107; F16L 21/113
USPC .......................................... 285/369, 373, 236
See application file for complete search history.

(56) References Cited

U.S. PATENT DOCUMENTS

| | | | |
|---|---|---|---|
| 1,891,874 A | 12/1932 | Elkins | |
| 3,233,922 A * | 2/1966 | Evans | F16L 21/005 285/236 |
| 3,359,017 A * | 12/1967 | Schaub | F16L 21/005 285/236 |
| 3,837,683 A * | 9/1974 | Taylor | F16L 21/005 285/236 |
| 4,538,839 A * | 9/1985 | Ledgerwood | F16L 21/005 285/236 |
| 4,564,220 A * | 1/1986 | Sills | F16L 21/005 285/236 |
| 5,431,458 A * | 7/1995 | Schaub | F16L 21/005 285/236 |
| 9,395,025 B2 | 7/2016 | Ireland et al. | |
| 9,534,718 B2 | 1/2017 | O'Neil et al. | |
| 2008/0042430 A1* | 2/2008 | Ichikawa | F16L 27/107 285/61 |
| 2012/0005866 A1* | 1/2012 | Ireland | E03C 1/12 24/278 |
| 2015/0115605 A1* | 4/2015 | Gramza | F16L 21/06 285/410 |
| 2016/0356409 A1* | 12/2016 | Kenney | F16L 21/005 |

\* cited by examiner

*Primary Examiner* — Aaron M Dunwoody
(74) *Attorney, Agent, or Firm* — Merchant & Gould P.C.

(57) ABSTRACT

A no-hub connector has a tubular gasket enclosed by a tubular shield and includes two end clamps and two intermediate clamps to tighten the connector around the ends of two pipe sections joined by the connector. Axially extending straps are fastened to each ring clamp, and fastened to the shield at the location of each ring clamp encircling the shield. An inward facing shield surface has optional gripping projections and the shield may optionally extend axially past the intermediate clamps to the end clamps. The inward facing surface of the end clamps may have optional gripping projections if the shield does not extend axially to the end clamps.

20 Claims, 10 Drawing Sheets

NO-HUB PIPE COUPLING METHOD AND APPARATUS

CROSS-REFERENCE TO RELATED APPLICATIONS

The application claims the benefit under 35 U.S.C. § 119(e) to Provisional Patent Application No. 62/731,624 filed Sep. 14, 2018, the entire contents of which are incorporated herein by reference.

STATEMENT RE: FEDERALLY SPONSORED RESEARCH/DEVELOPMENT

Not Applicable

BACKGROUND

No-hub couplings are used to join the ends of two metal pipes where the ends do not have spigots or ends configured to mate and engage with each other, such as mating threaded ends or mating male and female ends. The no-hub couplings are used primarily with metal pipes because plastic pipes are adhesive welded together using intermediate connectors and because the plastic pipes have a much lower ability to withstand the radial clamping forces used to create fluid tight seals on the no-hub connectors.

U.S. Pat. No. 5,431,458 to Schaub discloses a no-hub coupling using a tubular gasket with a corrugated metal shield outside the gasket and four separate, circumferential clamps around the shield to clamp the shield and gasket to the pipe ends. These types of no-hub couplings rely on friction to prevent separation of the pipes along the longitudinal length of the pipes. Clamping the rubber gasket to the radially outer surface of the pipes may create a low strength connection in the longitudinal direction as the gasket material is weak and may tear when the longitudinal force is great enough. There is thus a need for an improved no-hub connector that provides more axial strength and stiffness that improves the axial connection between the band clamps, and that improves the frictional connection between the clamping bands and the pipe, and that improves lateral strength and stiffness of the connection.

U.S. Pat. No. 9,395,025 to Ireland discloses a no-hub coupling with a rubber gasket and corrugated shield with a single clamping band on each end of the shield and each end of the joined pipe sections. Ireland overlays that no-hub coupling with a separate part having two more clamping bands that are each riveted to two longitudinal straps long enough so the added clamping bands are on the pipes, outward of the no-hub coupling but right next to the no-hub coupling and its gasket. The connected clamping bands each have an abrasive inner surface to grip the pipe, using a barrel nut and trunnion connected by bolts to tighten the added clamping bands. Ireland's use of two separate parts creates logistic problems and installation difficulties in handling and connecting separate parts. Moreover, axial movement of the no-hub coupling relative to the added clamps may disrupt the function of the no-hub coupling. There is thus a continued need for an improved no-hub connector that provides more axial strength and stiffness that improves the axial connection between the clamping bands, and that improves the frictional connection between the clamping bands and the pipe, and that improves lateral strength and stiffness of the connection. There is a further need for a no-hub coupling providing improved axial transmission of forces and improving the radial clamping forces and improved use of the radial clamping forces to improve axial transmission of those forces.

BRIEF SUMMARY

A no-hub connector has a tubular gasket enclosed by and optionally connected to a tubular shield. The connector has two opposing end clamps and two intermediate clamps each of which are tightened to clamp opposing ends of the connector around a different one of the ends of two pipe sections joined by the connector. Axially extending straps are fastened to each ring clamp and also fastened and to the shield for each ring clamp that encircles the shield, to axially connect those parts. An inward facing shield surface has optional gripping projections and the shield may optionally extend past the intermediate clamps to the end clamps, with the axial straps providing an axial connection with the end clamps when the shield does not extend to the end clamps. The inward facing surface of the end clamps may have optional gripping projections if the shield does not extend to the end clamps.

There is thus advantageously provided a no-hub connector for holding together first and second ends of first and second pipe sections extending along a longitudinal axis. The connector encircles a juncture of the ends of the pipe sections with a tubular sealing gasket enclosed by a tubular metal shield, both of which extend across the pipe juncture and both of which are clamped to both pipe sections to form a sealed pipe connection suitable for the intended use of the connector. The connector includes at least four, adjustable length ring clamps. The ring clamps include first and second end clamps on opposing first and second ends of the connector and first and second intermediate clamps adjacent the respective first and second end clamps but axially inward of the respective first and second end clamps. Each ring clamp has a clamp strap encircling the longitudinal axis and one of the pipe sections during use.

The connector also includes at least two and preferably three or more separate axial straps each extending parallel to the longitudinal axis and equally spaced around that axis. Each of the first and second end clamps and the first and second intermediate clamps are fastened to each of the axial straps. The shield is also fastened to each of the axial straps. The first and second intermediate clamps are spaced an axial distance apart that is sufficiently large so that the pipe juncture may be located between the first and second intermediate clamps during use and so the first and second intermediate clamps may be tightened against the first and second pipe sections, respectively, during use. The shield and gasket have an axial length sufficient to extend to an axially outer side of the clamp straps of the first and second intermediate clamps. The axial connection provided by the axial straps is believed to provide improved resistance to axial separation of the pipe sections.

In further variations, the shield and gasket do not extend axially to the first and second end clamps and advantageously extend axially a short distance of 0.1 to 0.5 inches beyond the axial ends of those end clamps. In a further variation, the intermediate clamps may have a clamp strap with axial width W, and the first and second end clamps may be spaced an axial distance of at least W from the respective adjacent first and second end clamp. In a still further variation, a radially inward facing surface of the first and second end clamps may have a textured gripping surface around a circumference of the end clamps. Additionally, a radially inward facing surface of the first and second end clamps may no textured gripping surface. Advantageously, each of the at least two and preferably three axial straps are permanently fastened to the shield by one of a spot weld or a rivet. In still further variations, each location where the ring clamps are fastened to the axial strap may include a rivet having a shaft with a rivet head on opposing ends of the shaft with the shaft passing through a circumferential slot in the clamp strap, so the rivet shaft can move along the slot as the length of the clamp strap changes.

The above variations may also be applied to a shield having an axial length that extends to the first and second end clamps, with the shield fastened to each of the axial straps at the first and second end clamps, and with the gasket does extending axially to the first and second end clamps. In these variations, the intermediate clamps may have a clamp strap with axial width W, and the first and second end clamps may be spaced an axial distance of at least W from the respective adjacent first and second end clamp. The radially inward facing surface of the shield may have a textured gripping surface extending around a circumference of the shield at least radially inward of the end clamps. Alternatively, a radially inward facing surface of the shield may have no textured gripping surface extending around a circumference of the shield at least radially inward of the end clamps. Each of the at least two and preferably three axial straps may be permanently fastened to the shield by one of a spot weld or a rivet, or alternatively, each location where the ring clamps are fastened to the axial strap may include a rivet having a shaft with a rivet head on opposing ends of the shaft with the shaft passing through a circumferential slot in the clamp strap so the rivet shaft can move along the slot as the length of the clamp strap changes.

Each of the above variations may include a ring clamp having a worm drive tightening mechanism at one end of the clamp strap and a plurality of parallel slots at an opposing end of the clamp strap. Preferably, there are only four ring clamps in the above variations.

There is also provided a pipe joint using any of the variations described above or herein, with the first end clamp and first intermediate clamp being clamped to the first pipe section, and with the second end clamp and the second intermediate clamp being clamped to the second pipe section.

The no-hub connector is believed to provide more axial strength and stiffness than the prior art and to improve the axial connection between the band clamps. The no-hub connector is believed to improve the frictional connection between the band clamps and the pipe, and to improve the lateral strength and stiffness of the connection. The no-hub connector is believed to improve axial transmission of forces, to improve the radial clamping forces, to improve use of the radial clamping forces and to improve axial transmission of those forces.

BRIEF DESCRIPTION OF THE DRAWINGS

These and other advantages and features of the invention will be better appreciated in view of the following drawings and descriptions in which like numbers refer to like parts throughout, and in which.

DETAILED DESCRIPTION

As used herein, the radial direction is with respect to longitudinal axis 26. Thus, for example, radially inward or radially inner refer to directions or surfaces toward the axis 26 while radially outer or radially outward refer to surface or directions away from the axis 26. As used herein, the axial direction is parallel to longitudinal axis 26 and inner and outer axial directions are relative to a central plane at the center of the no-hub connector assembly which plane is orthogonal to the axis 26. Thus, for example axially outward or axially outer surface refers to direction or surface measured along axis 26 away from the central plane, and an axially inward or axially inner surface refer to direction or surface along axis 26 toward the central plane.

Referring to FIGS. 1A-1F and 6A, a no-hub coupling assembly 20 is shown for use in coupling or joining first and second pipe sections 21a, 21b (FIG. 6A) to provide a structural connection that prevents leaks of fluid or gas, depending on the use of the pipe and the permitted pressures in the pipe joint. The coupling assembly 20 has first and second opposing ends with a first end clamp 22 at the first end and a second end clamp 24 at the opposing, second end. Each clamp 22, 24 encircles and is centered on the longitudinal axis 26 during use. A first intermediate clamp 28 is adjacent the first end clamp 22 and second intermediate clamp 30 is adjacent the second end clamp 24, with the intermediate clamps 28, 30 (and any additional intermediate clamps) being between the end clamps 22, 24 and between any additional end clamps. More than one end clamp and more than one intermediate clamp may be provided on one or both of the first and second ends of the coupling assembly 20. Each clamp 22, 24 and each intermediate clamp 28, 30 has an adjustable length allowing adjustment of the clamp diameter as discussed later.

The first and second end clamps 22, 24 have a clamp band or clamp strap encircling the longitudinal axis and that clamp strap has a width W measured along the longitudinal axis 26 and the width W for each end clamp and intermediate clamp are advantageously all the same. The first and second end clamps 22, 24 have an axially outer end 22a, 24a located on opposing sides of the central plane of the coupling. The first and second end clamps 22, 24 have an inward axial end 22b, 24b located toward that mid-plane of the coupling. Likewise, the first and second intermediate clamps 28, 30 have axial outer ends 28a, 30a and axially inner ends 28b, 30b.

A tubular shield 32 is located inside the clamps 22, 24, 28, 30 in the undeformed configuration of this embodiment. The tubular shield is a continuous tube encircling axis 26 and extending axially between the first and second end clamps 22, 24 and preferably extending axially between the outward ends of those first and second end clamps. Thus, at least the intermediate clamps 24, 30, and preferably all the clamps 22, 24, 28 and 30 encircle and contact the radially outer surface of the tubular shield 32 so the clamps can squeeze the shield inward toward axis 26 when tightened. The shield 32 is preferably, but optionally corrugated with the corrugations running parallel to the axis 26 and preferably continuously between the opposing distal ends of the coupling assembly 20.

Each clamp 22, 24, 28, 30 is fastened by fastener 36 to each of a plurality of axial straps 34 which each extend parallel to the longitudinal axis 26, with three axial straps 34 being shown, each equally spaced about the longitudinal axis 26. Advantageously, the shield 32 is also fastened by the same fastener 36 to each axial strap 34. The shield 32, one of the clamps 22, 24, 28, 30 and one of the axial straps 34 may be spot welded or otherwise fastened together by each fastener 36. While three axial straps 34 are shown, it is believed that two straps on opposing sides of the coupling assembly 20 may be used. Thus, at least two and preferably three axial straps 34 are used, with the axial straps equally spaced about the axis 26.

Preferably, a fastener in the form of a rivet having a low-profile head on the inner side of the shield 32 located toward the axis 26, extends radially through the shield 32, one of the clamps and one of the straps to fasten those parts together. But the fastener 36 may comprise a spot weld. Thus, each clamp 22, 24, 28, 30 is fastened to each axial strap 34 by one fastener 36 and each clamp is fastened to the shield by a plurality of fasteners 36. For example, if there are three axial straps 34 then each clamp is fastened to the shield at three, circumferentially spaced locations around each clamp. Each fastener 36 connects the axial strap to the shield 32. The axial straps 34 are located on the radially outer side of the clamps and shield and advantageously extend straight between each clamp to which the strap is connected.

Figures 1A, 1B:
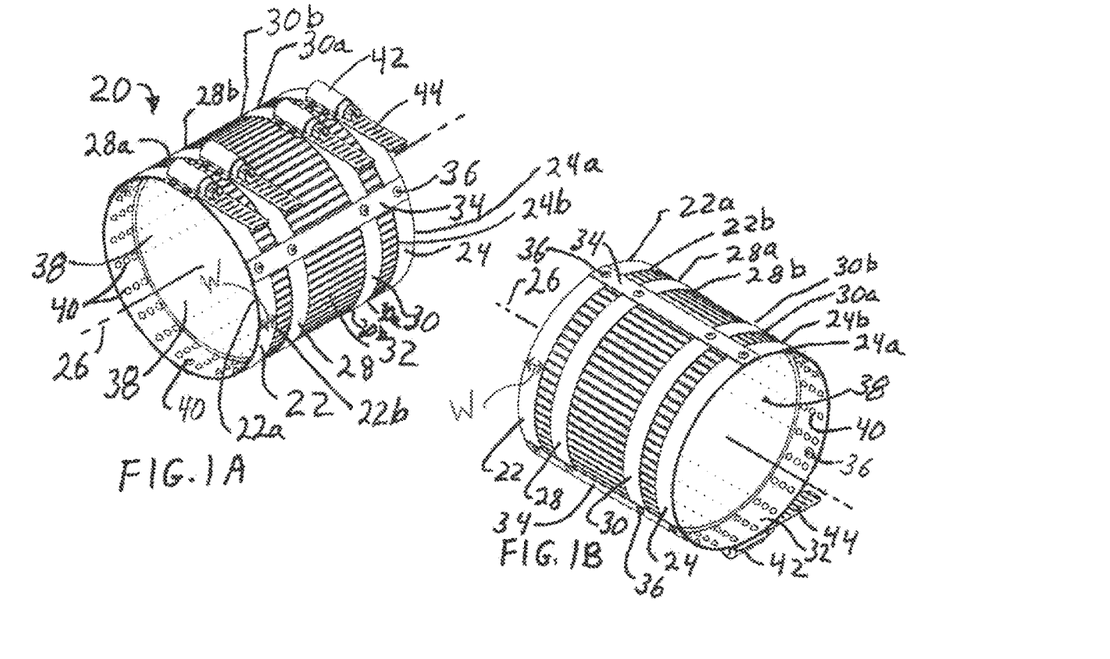
FIG. 1A is a top perspective view of a no-hub pipe coupling assembly showing the tightening mechanism of the band clamps.
FIG. 1B is a top perspective view of the no-hub pipe coupling assembly of FIG. 1A, showing the opposing end of the coupling assembly and the opposing side of the coupling assembly.
Figures 1C, 1D:
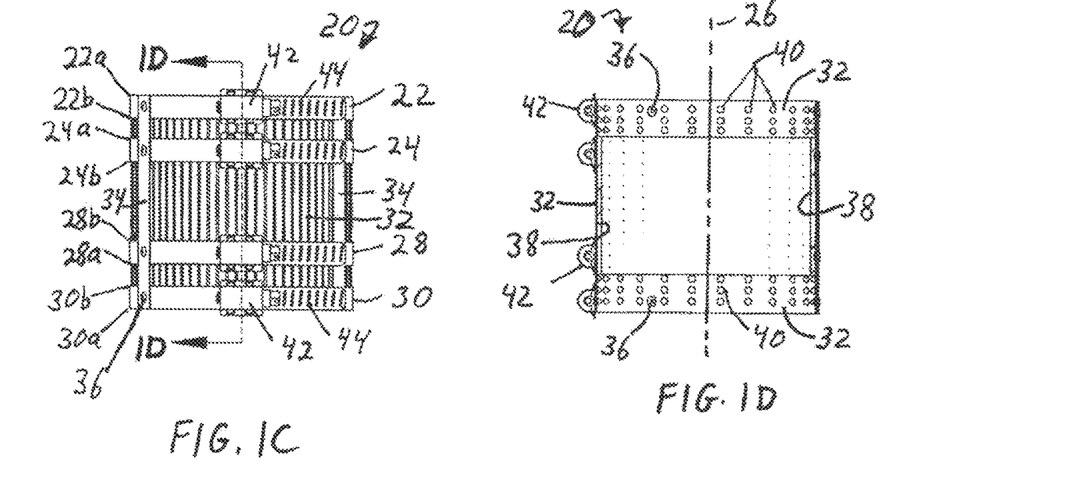
FIG. 1C is a side view of the coupling assembly of FIG. 1A showing the tightening mechanism on the band clamps.
FIG. 1D is a sectional view taken along section 1D-1D of FIG. 1C.
Figure 1E:
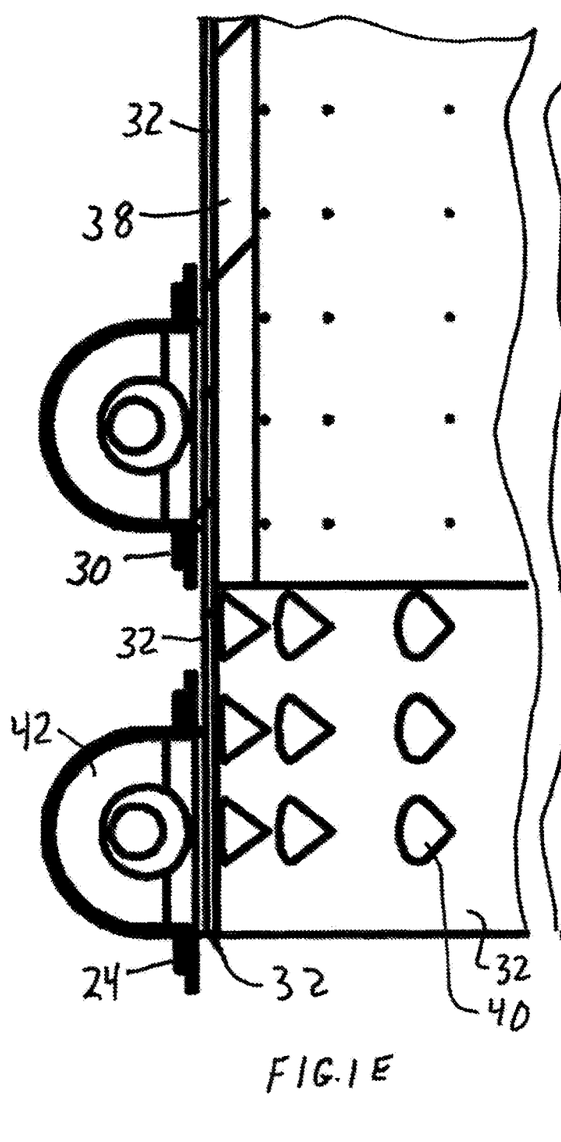
FIG. 1E is an enlarged sectional view of the lower left corner of FIG. 1D.
Figure 1F:
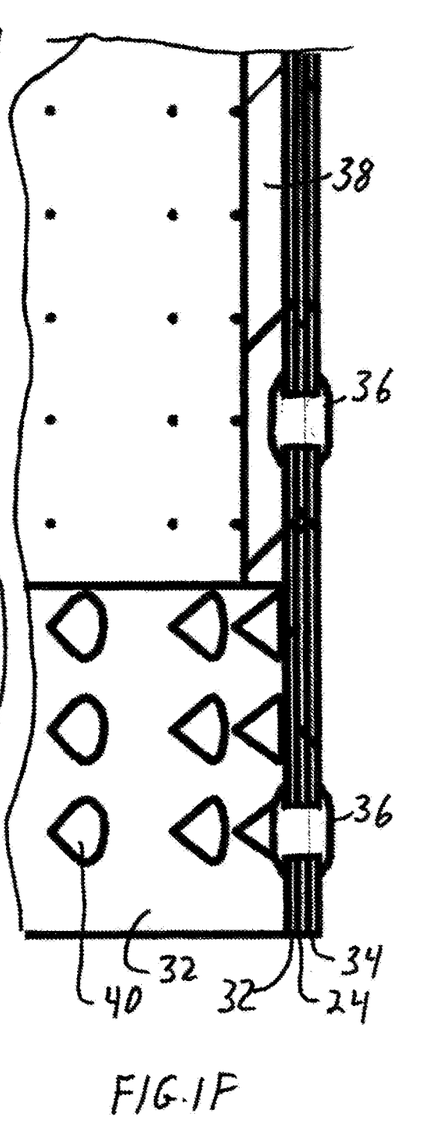
FIG. 1F is an enlarged sectional view of the lower right corner of FIG. 1D.
Figures 2A, 2B:
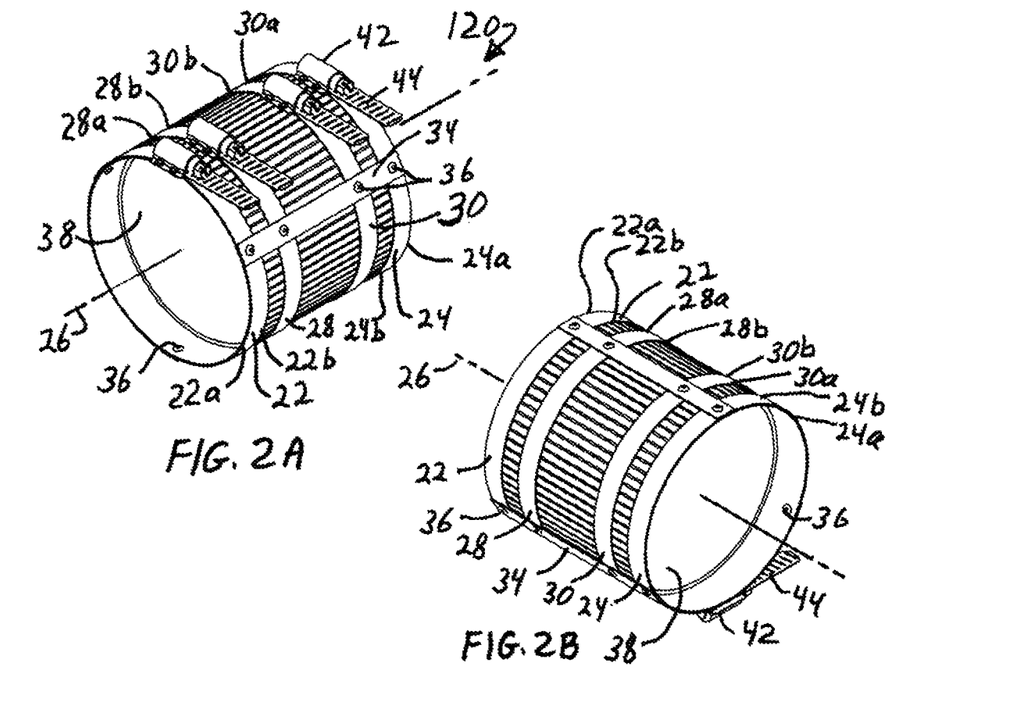
FIG. 2A is a top perspective view of a second embodiment of a no-hub pipe coupling assembly showing the tightening mechanism of the band clamps.
FIG. 2B is a top perspective view of the no-hub pipe coupling assembly of FIG. 2A, showing the opposing end of the coupling assembly and the opposing side of the coupling assembly.
Figure 2C:
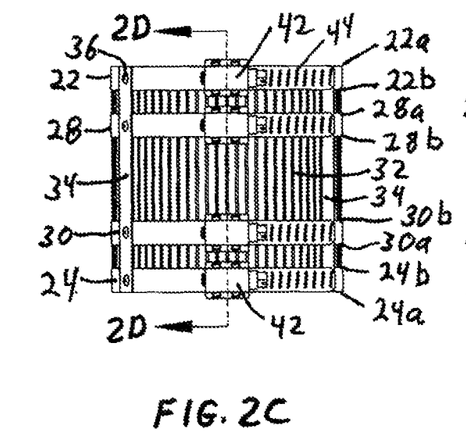
FIG. 2D is a sectional view taken along section 2D-2D of FIG. 2C.
FIG. 2E is an enlarged sectional view of the lower left corner of FIG. 2D.
FIG. 2F is an enlarged sectional view of the lower right corner of FIG. 2D.
Figure 2D:
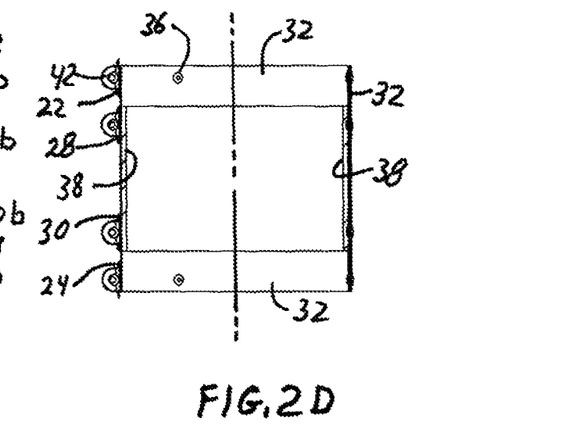
Figure 2E:
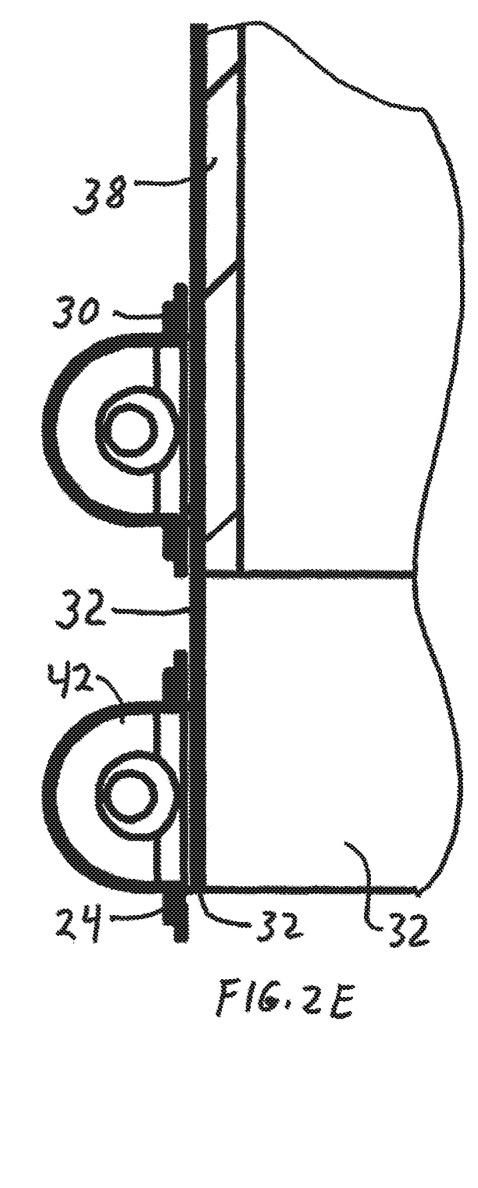
Figure 2F:
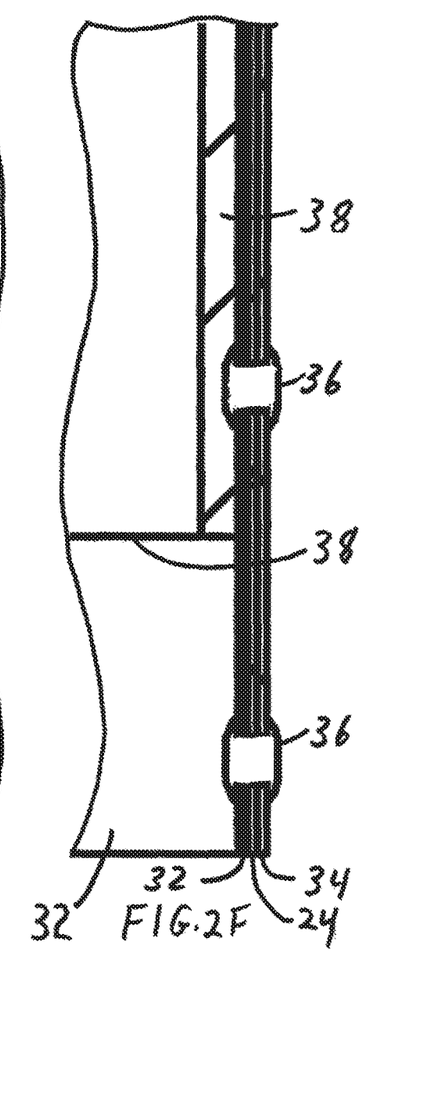
Figures 3A, 3B:
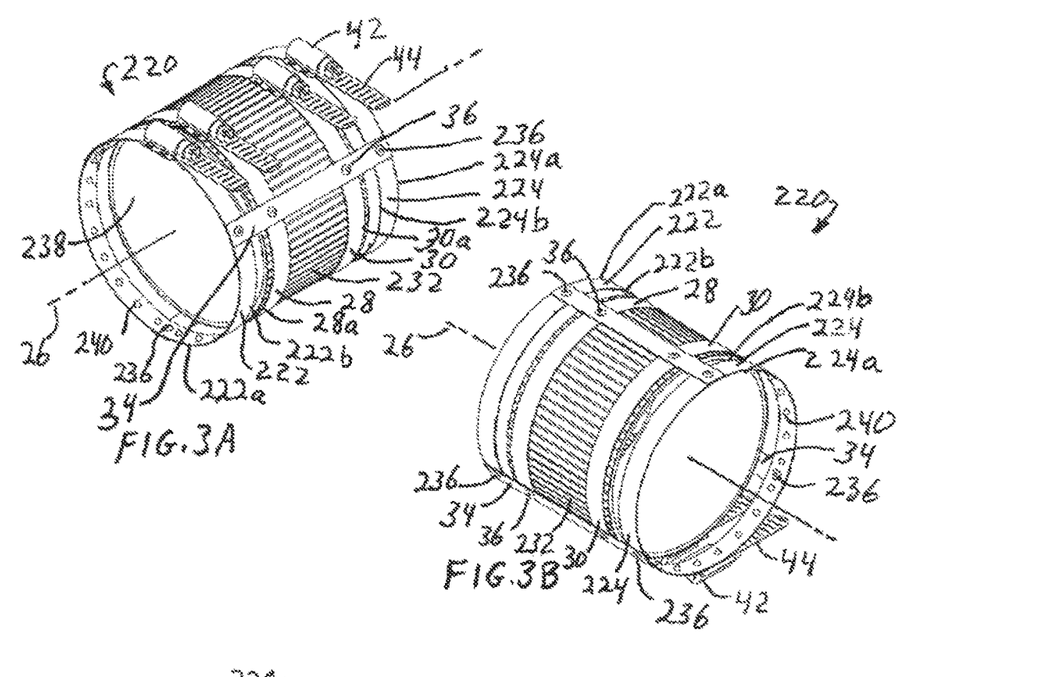
FIG. 3A is a top perspective view of a third embodiment of a no-hub pipe coupling assembly showing the tightening mechanism of the band clamps.
FIG. 3B is a top perspective view of the no-hub pipe coupling assembly of FIG. 3A, showing the opposing end of the coupling assembly and the opposing side of the coupling assembly.
Figure 3C:
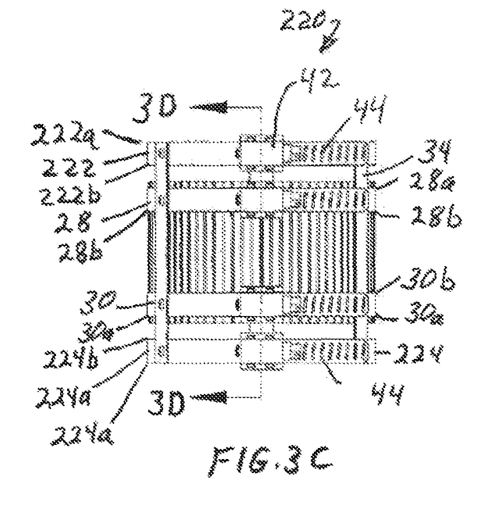
FIG. 3C is a side view of the coupling assembly of FIG. 3A showing the tightening mechanism on the band clamps.
Figure 3D:
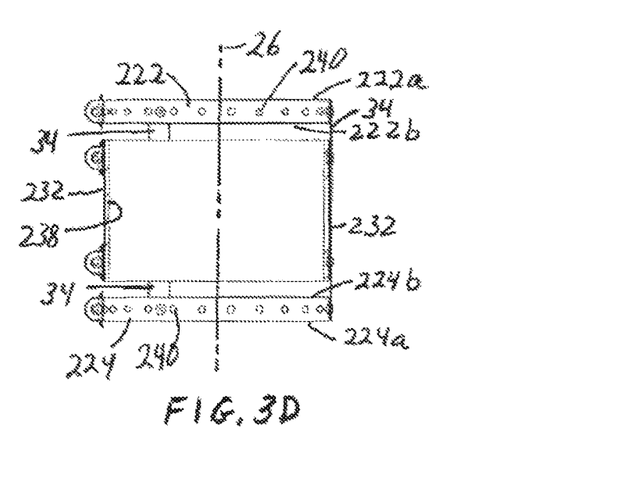
FIG. 3D is a sectional view taken along section 3D-3D of FIG. 3C.
Figure 3E:
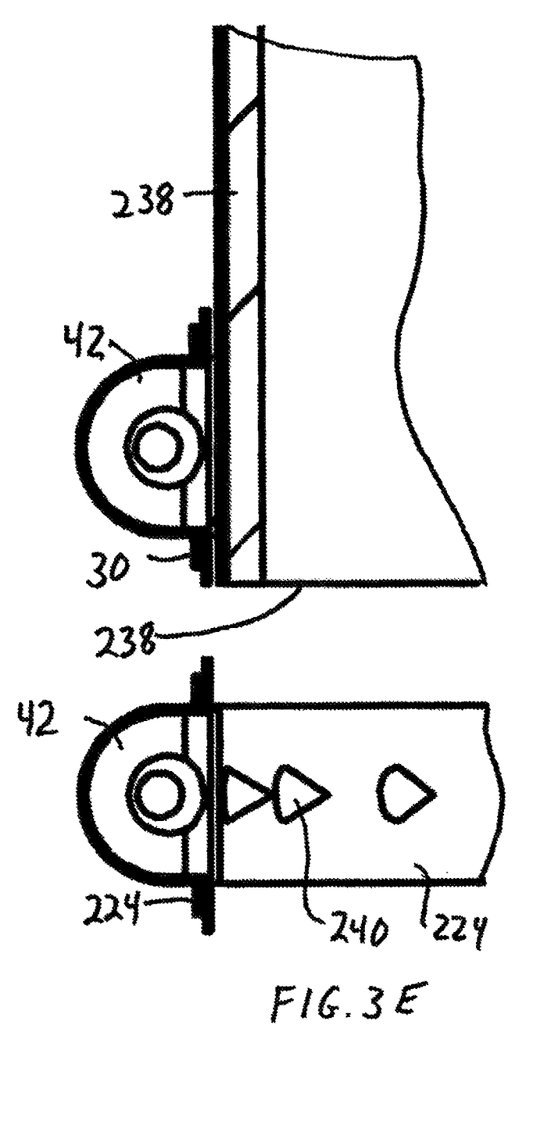
FIG. 3E is an enlarged sectional view of the lower left corner of FIG. 3D.
Figure 3F:
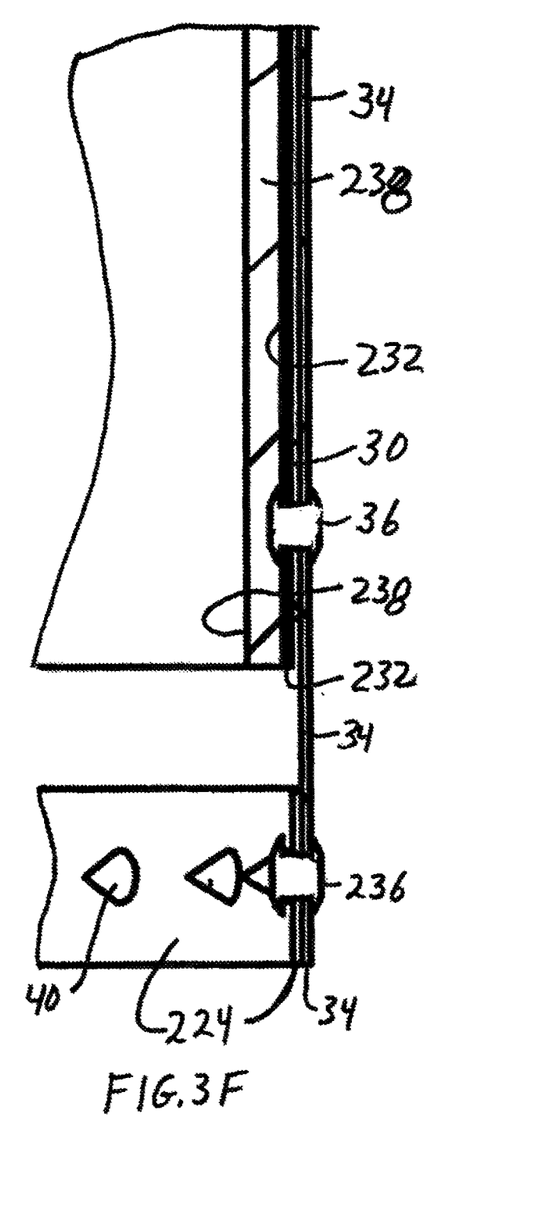
FIG. 3F is an enlarged sectional view of the lower right corner of FIG. 3D.
Figures 4A, 4B:
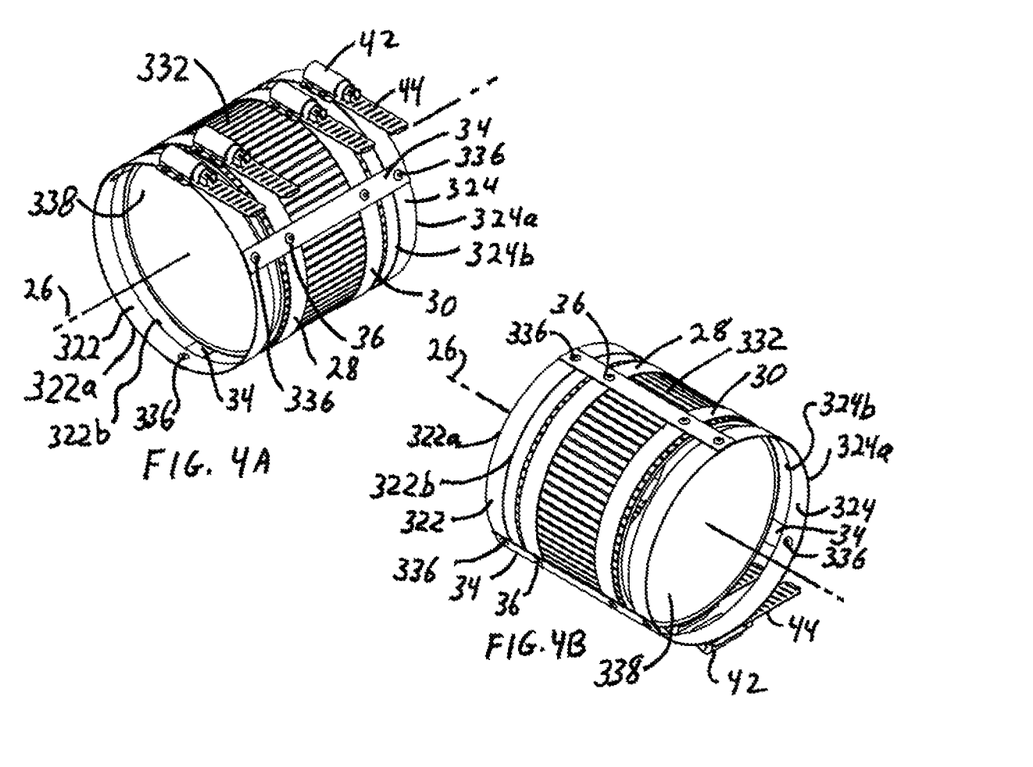
FIG. 4A is a top perspective view of a fourth embodiment of a no-hub pipe coupling assembly showing the tightening mechanism of the band clamps.
FIG. 4B is a top perspective view of the no-hub pipe coupling assembly of FIG. 4A, showing the opposing end of the coupling assembly and the opposing side of the coupling assembly.
Figure 4C:
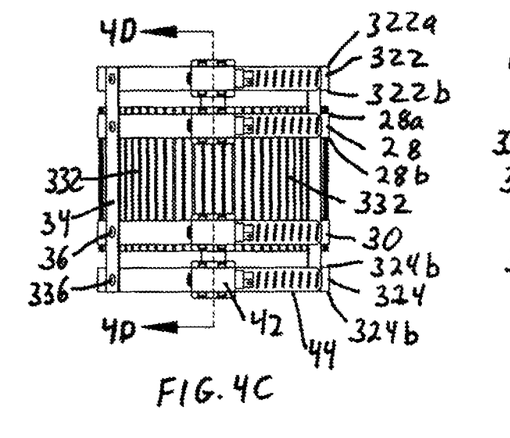
FIG. 4C is a side view of the coupling assembly of FIG. 4A showing the tightening mechanism on the band clamps.
Figure 4D:
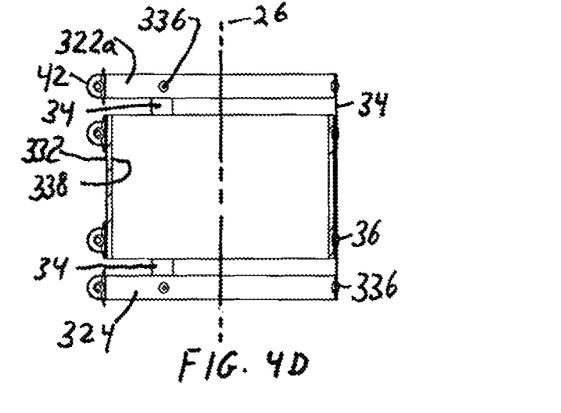
FIG. 4D is a sectional view taken along section 4D-4D of FIG. 4C.
Figure 4E:
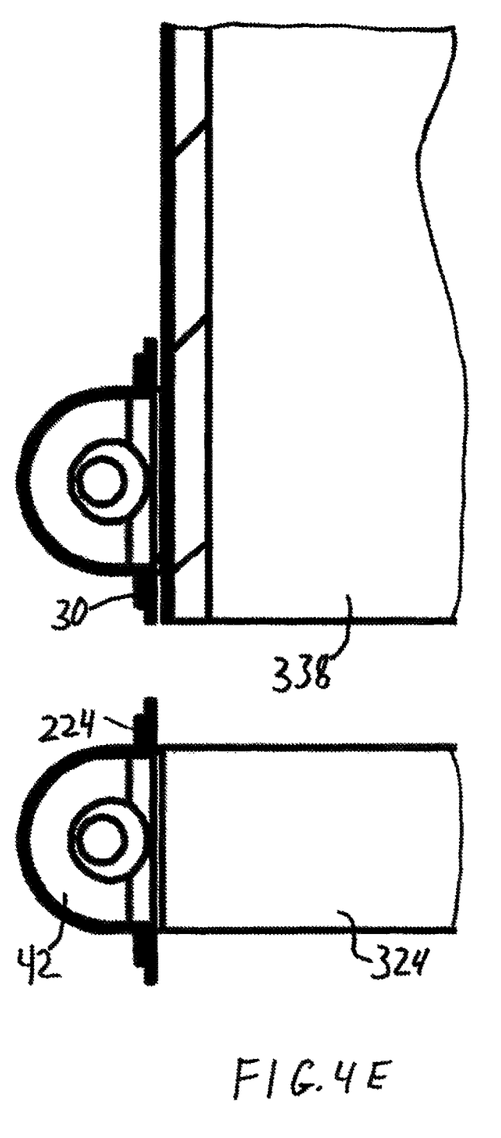
FIG. 4E is an enlarged sectional view of the lower left corner of FIG. 4D.
Figure 4F:
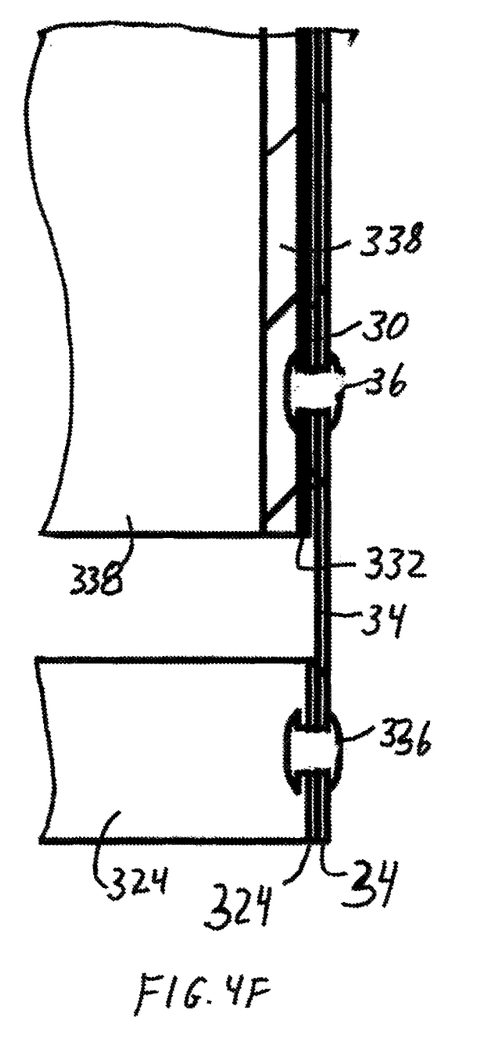
FIG. 4F is an enlarged sectional view of the lower right corner of FIG. 4.

A tubular gasket 38 is located inside the shield 32 and advantageously centered at the middle of the coupling assembly. The shield 32 advantageously encloses and is connected to the gasket 38. The gasket 38 is interposed between the shield and the inside of the coupling assembly 20 and any pipe passing therethrough. The gasket 38 is also interposed between the fastener 36 the pipe sections 21a, 21b. The gasket 38 is made of rubber or elastomeric material, or other suitably resilient sealing material suitable for use in the coupling to form a water tight or fluid tight seal when compressed around the connected distal ends of the pipe sections 21a, 21b, with the nature of the gasket material and the quality of the liquid seal or fluid seal varying with the specific application as known in the art and not described in detail herein.

As seen in FIGS. 1A, 1B and 1D-1F, the shield 32 extends axially the entire length of the coupling assembly, to the distal axial end (outer ends 22a, 24a) of the first and second end clamps 22, 24. The gasket 38 does not extend to the opposing axial ends of the shield and instead stops at locations spaced inward from the distal ends or outer ends 22a, 24a of the shield 32. The gasket 38 is advantageously symmetrically located and centered along the length of the shield 32. The end clamps 22, 24 are each located axially outward of the respective axial ends of the gasket 38.

The axial distance between the end clamp 22 and the nearest intermediate clamp 28 will vary with the diameter of the pipe sections 21a, 21b. It is believed preferable to have the end clamps 22, 24 close to the adjacent intermediate clamp 28, 30, with the axial gap being about half to 100% of the axial width W of the clamp strap on the end clamps 22, 24, which are preferable the same width. An axial space or gap of 0.5 inches is believed suitable for smaller diameter pipe sections up to about 8-inch nominal diameter pipe diameters, and an axial space or gap of about 1 inch for pipes having nominal (internal) pipe diameters from 8 to 12 inches, are believed suitable.

The inner surface of the shield 32 is provided with a gripping surface 40 that advantageously comprises a plurality of inwardly extending spikes or gripping projections, but could include abrasives fastened to the shield 32 by adhesives, melting or other known mechanisms. For ease of reference, the gripping surface and gripping projections will both use the part number 40. The gripping projections 40 may be formed by radially piercing the shield 32 with a narrow point or small cylindrical projection to form an opening through the cylindrical shield while the split and upset metal forming the opening extends inward. The gripping projections 40 advantageously have sharp corners or edges configured to physically engage the radially outer surface of pipe sections 21a or 21b. Advantageously, the gripping projections 40 are of a hardened material such as silicon carbide. Advantageously, the gripping projections 40 may comprise discrete projections that are arranged in a pattern of circumferential rows and axial columns and extend from end to end on the inner side of the shield 32. The gripping projections 40 may pierce the radially outer portion of gasket 38, but advantageously do not normally penetrate through the radial thickness of the gasket during use.

As best seen in FIGS. 1D to 1F, the shield 32 extends the entire length of the coupling assembly and thus extends axially from the first axially outer end 22a to the second axially outer end 24a, of the first and second end clamps 22, 24, respectively. As seen in FIGS. 1A and 1C, the tightening mechanism 42 may extend axially slightly beyond the outer sides of the shield and beyond the outer side of the circumferential strap tightened by the tightening mechanism 42.

The gasket 38 advantageously ends at a location axially inward of the axially outer ends 28a, 30a of the first and second intermediate clamps 28, 30. The gripping projections 40 may be located only on the inward surface of the shield 32 which extends axially outward of the gasket 38, which surface corresponds to the axial length of the shield located axially outward of the axially outer ends 28a, 30a of the first and second intermediate clamps 28, 30, respectively. Thus, the gripping projections 40 may extend along an axial length between the axially outer ends 22a, 28a of the clamps 22, 28 on the first end of the coupling assembly, and extend along an axial length between the axially outer ends 24a and 30a on the clamps 24, 30. In the described variation. It is believed advantageous that the axially outer ends of the gasket 38 engage some of the projections 40 to help hold the gasket in position relative to the shield 32.

Alternatively, the gripping projections 40 may extend along the entire axial length of the shield 32, from axially outer end 22a to axially outer end 24a of the first and second end clamps 22, 24, respectively. This variation is reflected by the dots shown in FIGS. 1A and 1B in the gasket 38. In this alternative variation, the gripping projections 40 are sized relative to the gasket 38 so the projections do not extend through the radial thickness of the gasket as that could contribute to potential leakage at the juncture of the ends of pipe sections 21a, 21b.

Each of the clamps 22a, 22b, 24a, 24b comprise a ring clamp, sometimes referred to as a hose clamp or clamp band. Each clamp encircles the longitudinal axis and when tightened by shortening the circumferential length of the clamp, the clamp moves radially inward toward the axis 26 to provide a frictional grip against the components located radially inward of each particular clamp. Each ring clamp has a flexible strap, usually a solid, stainless steel strap, and also has a tightening mechanism 42 on a first end of the strap and a mating engaging structure 44 on the opposing, second end of the strap. The tightening mechanism 42 engages the engaging structure 44 to hold the opposing ends of the strap together and change the length of the strap. Typically, a worm screw or toggle bolt comprises the tightening mechanism 42 and a series of parallel slots or a threaded nut form the engaging structure 44. The worm screw engages apertures or the projecting bars between apertures to connect the ends of the strap and change the length. The toggle bolt may be held in a rotating barrel with the threaded end engaging a stationary, mating threaded nut to engage the ends of the strap and change the length of the strap as at least one of the bolt and nut rotate relative to each other. The tightening mechanism 42 and engaging structure 44 are mechanical mechanisms that physically engage the engaging structure 44 to tighten and loosen the clamps, with the primary emphasis being on tightening the clamps to frictionally engage or grip one of the pipe sections 21a, 21b.

The depicted embodiments use ring clamps with worm drives engaging the bars between parallel slots on the end of the strap to change the length of the ring clamp's strap. The particular type of ring clamp is not believed critical and thus any known ring clamp is believed suitable for the clamps 22, 24, 28, 30 or such additional clamps as are provided with the coupling assembly 20. Advantageously, the same type of clamp is used for each of the clamps 22, 24, 28, and 30, so it is easier for the user to tighten or loosen the clamps. Moreover, additional intermediate clamps may be used and additional end clamps may be used—each of which clamp is fastened to the axial strap 34 and thus connected to the other clamps as described herein.

In use, the connector assembly 20 may be handled as a single unit because the axial straps 34 hold the parts together and allow easy manipulation and placement of the entire assembly as a single, connected unit. The first end of the connector assembly 20 is placed over the distal end of first pipe section 21a or the distal end of the first pipe section 21a is inserted into the first end of the connector assembly. The distal end of the second pipe section 21b is placed adjacent to and preferably in contact with the distal end of the first pipe section 21a, and that may require inserting the distal end of the second pipe section 21b into the second end of the coupling assembly 20, or it may require contacting the joined pipe ends and sliding the coupling assembly 20 axially over the contacting or adjacent ends of the pipe sections 21a, 21b.

When the distal ends of the first and second pipe sections 21a, 21b are in position and the gasket 38 is positioned over the adjacent or contacting distal ends of those pipe sections, then the first and second end clamps 22, 24 and the intermediate clamps 28, 30 are tightened. The connector assembly 20 allows a liquid seal and fluid seal to be established by clamping the gasket 34 to each of the pipe sections 21a, 21b. The connector assembly 20 has the end clamps 22, 24 in position to further clamp the assembly to the pipe sections themselves, without the intervening rubber or elastomeric gasket which allows better gripping of the pipe sections without needing to hold and position the end clamps while also tightening them. The single unit assembly is believed to greatly simplify the installation and that advantage applies to all the embodiments described herein.

There may be advantages in the sequence in which the various clamps 22, 24, 28 and 30 are tightened for different situations, as for example, if the longitudinal axes of end pipe sections 21a, 21b are slightly offset, or if one pipe section is slightly different in diameter than the other, or if the pipe ends are not square, or combinations of those and other irregularities. The tightening sequence to address problems arising from different shapes or locations of mating end pipe sections 21a, 21b is not the focus of this application.

In use, the first end clamp 22 and first intermediate clamp 28 engage the first pipe section 21a, while the second end clamp 24 and second intermediate clamp 30 engage the second pipe section 21b. The intermediate end clamps 28, 30 press the gasket 38 against the respective pipe section located radially inward of the clamps to form a water tight seal and advantageously a fluid tight seal appropriate for the needs of the particular pipe coupling. The end clamps 22, 24 engage the pipe sections more directly (as the gasket is absent) and press the shield 32 and its engaging projections against and advantageously into the axially outer surface of the metal pipe sections 21a, 21b, located radially inward of the respective clamps 22, 24. The axial straps 34 connecting the end clamps 22, 24 are believed to provide an axial connection restraining axial separation of the pipe segments 21a, 21b. The axial straps 34 connecting the intermediate clamps 28, 30 are also believed to provide an axial connection restraining axial separation of the pipe segments 21a, 21b.

By providing an axial connection among all of the encircling clamps 22, 24, 28, 30, it is believed that a synergistic effect is achieved to strengthen the axial clamping and resistance to pipe separation of each of the individual clamps. Thus, for example, if the pipe segment 21a radially inward of intermediate clamp 28 begins axial separation away from pipe segment 21b, the axially coupled clamps 22 and 30 and 24 are believed to contribute to resisting that axial separation. Clamp 22 is connected to the same pipe segment 21a that is beginning to separate and it resists separation by pulling on axial straps 34, while clamps 24, 30 connect to the opposing pipe section 21b and believed to provide a base to resist the separating motion by pulling against the separation through straps 34. Further, by providing axial straps 34 spaced around the circumference of the pipe sections 21a, 21b, a tilting separation of one pipe section relative to the other results in the pipe ends contacting on one side of the joint and separating on the opposite side of the joint and that is believed to cause at least one and preferably two or more axial straps 34 and the clamps fastened to those straps to resist the pipe end separation.

In addition to the end clamps axially coupling to the shield and the outer clamps to provide an axially stiffer structure, the shield 32 and gasket 38 provide further gripping of the pipe segments and believed to provide additional resistance to axial separation and they also help restrain lateral movement of the ends of the pipe sections. Extending the shield 32 the entire length of the connector assembly 20 provides a long length of engagement around the joined pipe segments 21a, 21b and that increased length is believed to provide improved resistance to relative lateral movement of the ends of the pipe segments 21a, 21b. The improved gripping and axial resistance at the end clamps provided by the gripping projections 40 is believed to cooperate with the shield extending over the length of the coupling 20 to provide improved axial and tilting resistance to separation and to improve resistance to lateral movement of the pipe segments.

As best seen in FIGS. 1D-1F, the end clamps 22, 24 are axially separated from the adjacent intermediate clamps 28, 30 with the axially outer end 28a, 30a of the intermediate clamps 28, 30 being axially outward of the ends of the gasket 38. During use, the portion of the shield 32 between the axially outer end 28a, 30a of the intermediate clamps, and the inner end 28b, 30b of the intermediate clamps bends inward toward axis 26 at an angle that will vary with the axial distance between the intermediate clamp and its adjacent end clamp. Advantageously, if the intermediate clamp 28, 30 is tightened first, then tightening the adjacent end clamp 22 and/or 24 is believed to slightly stretch the axial strap 34 as the clamp is moved toward axis 26, during tightening of the clamp. Slightly stretching the axial straps 34 is believed to provide a tighter and stronger coupling.

The axial straps 34 are thin and flexible and about an axis perpendicular to their length, such as axis 26. The axial straps are primarily tension carrying straps along the length of the straps. Connecting the shield 32 to the axial straps and to the clamps 22, 24, 28, 30 is believed to provide a coupling that has increased strength and stiffness along axis 26, and also in lateral directions perpendicular to axis 26 to improve resistance to lateral offsets of the joined pipe segments 21a, 21b and to improve resistance to tilting of the ends of the joined pipe segments and separation of those ends.

The pipe sections 21a, 21b may vary in diameter from 1.5 inches to 12 inches, or larger, and the diameter of clamps 22, 24, 28, 30 vary accordingly. The width of the metal bands used with the clamps increase with the diameter, with clamps having a clamp strap of about 0.5 inches wide and 0.02 to 0.03 inches thick for use with smaller diameter pipes up to 4 or 5 inches in diameter, and straps about ⅝ to 1 inch wide and 0.04 to 0.05 inches thick believed suitable for use with larger diameter pipes. For larger diameter pipes, a larger number of smaller clamps may be used instead of one larger width or larger thickness clamp strap. Thus, for larger diameter pipe couplers 20, there may be two or three first end clamps 22 and a like number of second end clamps 22 and intermediate clamps 28 and 30. But the relative numbers of intermediate clamps and end clamps can vary.

The clamps 22, 24, 28, 30 are advantageously fastened to the axial straps 34 by rivets or spot welding, providing a permanent connection that does not accommodate relative motion between the clamp and the axial strap 34. Any type of rivet or blind rivet is believed suitable for use as the fastener 36 and as used herein the term rivet includes blind fasteners with radially inward heads having a low enough profile to make them suitable for use with gasket 38 in the described embodiments. Rivetless fastening systems are also believed suitable for the fasteners 36, and involve a rotating punch deforming a first layer of material into a second layer of material and into a die abutting the surface of the second layer of material to form an enlarged head composed of the first and second material and which binds the layers of materials together. Information may be found on rivetless connections at www.wh-rivet.com.

Figure 5:
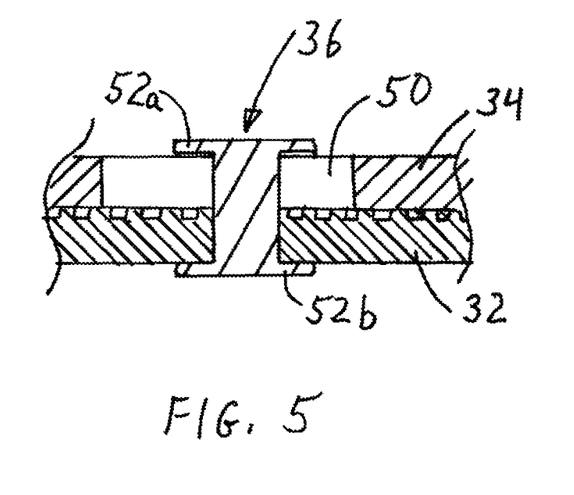
FIG. 5 is a sectional view showing a sliding rivet connection with an axial strap.

As seen in FIG. 5, if rivets are used as fasteners 36 to fasten the axial strap 34 to one of the various clamps 22, 24, 28, 30, then some circumferential motion of the rivet around the clamps can be achieved to accommodate circumferential tightening and loosening of the clamps, while limiting axial movement along the length of the axial straps 34. A short, circumferential slot 50 at the location of each rivet fastener 36 can extend along a length of the circumferentially encircling clamp strap forming the clamp 22, 24, 28, 30 with the width of the slot 50 sized to just pass the shaft 52 of the rivet. The rivet heads 54a, 54b are spaced radially slightly further apart than the radial thickness of the strap on the clamp and the radial thickness of the shield 32, so the rivet shaft can move along the length of the slot 50 but cannot move in a direction transverse to the slot. A length of about 0.5 to 1.5 inches for the slot 50 is believed suitable, with the smaller length for the smaller diameter pipe sections 21a, 21b, and the longer length suitable for the larger pipe diameters.

The axial strap 34 is of metal, preferably a solid strap of stainless steel having a thickness of 0.05 to 0.07 inches, and advantageously with a thickness of 0.06 inches so it is flexible along an axis perpendicular to its length. The number of axial straps 34 will increase with the diameter of the pipe sections 21a, 21b and the corresponding diameter of the coupling assemblies 20 which fits over the outer diameter of the pipe sections. Advantageously, at least two and preferably three longitudinal straps 34 are used and as the axial straps are equally spaced the three straps would be located at equal angular intervals of 120° around axis 26. For larger coupling assemblies more axial straps 34 may be used. For stronger axial separation resistance, more axial straps 34 may be used and the angular spacing would be less than 120° but preferably remain equally spaced.

The shield 32 is a thin metal tube having a radial thickness about the same as that of the circumferential straps on the clamps 22, 24, 28, 30, but the thickness can vary. The shield 32 may be a uniform radial thickness, or it may have longitudinal corrugations as shown. The corrugations may be continuous ribs, or intermittent and may be formed by a series of adjacent dimples extending radially outward and formed in the wall of the tubular shield. The radial thickness of the shield 32 may increase if increased lateral stiffness of the coupling assembly 20 is desired and the radial thickness may increase for the larger diameter coupling assemblies. But because the end clamps 22, 24 press the radially inner surface of the shield 32 against the pipe sections 21a, 21b, respectively, the radial thickness of the shield 32 is limited as it must be thin enough to bend and clamp the engaging projections 40 against the outer surfaces of the pipe sections radially inward of the end clamps.

Referring to FIGS. 2A to 2F, a second embodiment of the coupling assembly 120 is shown which is similar to the coupling assembly 20 of the first embodiment. Parts that are not changed bear the same part number and the description, use, variations and advantages of those parts are not repeated as they were previously described. Parts that are changed are incremented by 100.

The changes involve shield 132 which has no griping projections or gripping surface 40 on the radially inward surface of the shield. The gasket 32 is advantageously fastened by adhesives to the radially inside surface of the shield 132. Other than the absence of the gripping surface and gripping projections 40, the coupling assembly 120 is the same as the coupling assembly 20.

Thus, for example, each clamp 22, 24, 28, 30 is fastened to each axial strap 34 by one fastener 36 and each clamp is fastened to the shield 232 by a plurality of fasteners 36. For example, if there are three axial straps 34 then each clamp is fastened to the shield 132 at three, circumferentially spaced locations around the clamp. Each fastener 36 connects the axial strap to the shield 132. The functions and variations of the shield 132 not affected by the absence of the gripping projections 40 are the same as before and not repeated here.

In use, the coupling assembly does not grip the pipe segments 21a, 21b the same way as the first embodiment because the gripping projections 40 are missing from the shield 132. Thus, the resistance to axial separation of the pipe sections 21a, 21b is believed to be less than for the embodiment of FIGS. 1A-1F for a given radial compression of the end bands 22, 24 and intermediate bands. But the other described advantages of connecting the gasket 38, shield 32 and clamps 22, 24, 28, 30 (and others when present) to axial straps 34 and to the shield 32 apply.

Moreover, the connector assembly 120 allows easy manipulation and installation of the gasket seal and an addition gripping mechanism engaging the pipe sections. A liquid seal and/or a fluid seal is established by clamping the gasket 34 to each of the pipe sections 21a, 21b using intermediate clamps 28, 30. The connector assembly 120 has the end clamps 22, 24 in position to further clamp the assembly 120 to the pipe sections themselves, without the intervening rubber or elastomeric gasket which allows better gripping of the pipe sections without needing to hold and position the end clamps while also tightening them. The ease of manipulation and installation provided by interconnecting the shield and gasket with the end clamps 22, 24 is believed to be much simpler and more efficient than prior art installations, as well as resulting in stronger and stiffer connections.

Referring to FIGS. 3A to 3F, a third embodiment of a no-hub coupling assembly 220 is shown which is like the first embodiment of FIGS. 1A to 1F but with some differences in the shield and end clamps. The parts that are not changed have the same part numbers as in FIGS. 1A to 1F and the description, use, variations and advantages of those parts are not repeated. The parts that are changed are incremented by 200.

The main differences with the first embodiment are that the end clamps 222, 224 have a gripping surface 240 or gripping projections 240 (corresponding to gripping surface 40 and gripping projections 40) extending inward toward axis 26 from an inner facing surface of each of those end clamps. As the end clamps 222, 224 are modified, the outer ends 222a, 224a and the inner ends 222b, 224b are assigned new part numbers.

Another difference is that no shield is interposed between the end clamps and the pipe sections 21a, 21b. In this third embodiment the shield 232 extends about the same axial distance as the gasket 238 and both have an axial end located between first and second end clamps 222, 224 and the first and second intermediate clamp 28, 30, closest to the respective end clamps. Thus, a first axially outer end of the shield 232 and gasket 238 ends between the first clamp 222 and adjacent intermediate clamp 28 and a second axially outer end of the shield 232 and gasket 238 ends between the second clamp 224 and its adjacent intermediate clamp 30. A gap or space exists between the end clamps 222, 224 and the intermediate clamp 28, 30 nearest each end clamp, and that gap or space is preferably the width of the circumferential clamp strap of the end clamps, which are preferably all the same width. But the axial gap or space may vary.

The shield 232 is advantageously adhered to the gasket 238. The fasteners 236 on the end clamps 222, 224 are similar to the fasteners 36 as previously described but as the shield does not extend beneath the end clamps, the fasteners 36 do not extend radially through the shield as previously described at the location of the end clamps. Thus, each end clamp 222, 224 is fastened to each axial strap 34 by fasteners 236 which extend only through the axial strap 34 and one of the end clamps 222, 224. Each intermediate clamp 28, 30 is fastened to each axial strap 34 by fasteners 36 which may extend radially through the axial strap 34, one of the clamps 28, 30 and the shield 232 and may include a spot weld or a rivet. If there are three axial straps 34 then each intermediate clamp 28, 30 is still fastened to the shield 232 at three, circumferentially spaced locations around the intermediate clamps. In this embodiment, the end clamps 222, 224 are connected to the shield 232 and intermediate clamps 28, 30 only by the axial straps 34. An axial gap or space between the end clamps 222, 224 and the adjacent intermediate clamp 28, 30 is preferably the width of the end clamps 222, 224, which are preferably the same width as the intermediate clamps. But smaller or larger axial spaces may be used.

The use of the connector assembly 220 is as previously described for the embodiment of FIGS. 1A to 1F. As the end clamps 222, 224 are not fastened directly to the shield 232, the end clamps may move more easily in the radial direction as the axial straps 34 flex more than if the cylindrical shield were connected to the end clamps. The straps 34 are believed to hold the end clamps in position relative to the shield 232 so that a user can easily position the coupling 220 and pipe sections 21a, 21b to put the ends of each pipe section at the center of the coupling.

The end clamps 222, 224 directly engage the outer surface of the pipe segments 21a, 21b as no shield 32 or 232 is interposed between the end clamps and the pipe segments. The gripping projections 240 on the radially inward facing surface of the end clamps 222, 224 are believed to provide a strong and improved connection with the outer surface of pipe sections 21a, 21b as the clamps may embed the projections 240 into the surface of the pipe sections.

As the shield 232 and gasket 34 end at or shortly after the axially outermost adjacent intermediate clamps 28, 30, neither the shield nor the gasket inhibits the axial straps from bending inward toward longitudinal axis 26. It is believed that if the intermediate clamps 28, 30 adjacent the end clamps 222, 224, respectively, are tightened first, then this later tightening of the end clamps 222, 224 is believed to slightly stretch the axial straps 34 as the clamp is moved toward axis 26, during tightening of the clamp. The stretching is believed to arise in part because the gripping projections 340 engage the pipe sections and restrain axial movement of the end clamps as they are tightened. It is thus believed that placing the engaging projections on the inside of the end clamps will slightly stretch the axial straps 34. As previously described, placing the axial straps 34 in tension is believed to strength and stiffen the coupling assembly 20 and is likewise is believed to provide similar advantages to the coupling assembly 220. Moreover, as there is no intervening shield to allow axial slippage, it is believed that this embodiment should have more tension in the axial straps than the first embodiment of FIGS. 1A to 1B.

This direct engagement between end clamps and pipe sections and the omission of shield between the end clamps and the pipe sections, are believed to provide a stronger axial connection and stiffer axial connection between the pipe segments 21a, 21b and the axial straps 34, resulting in a coupling that is believed to better resist axial separation of the pipe segments than the prior art and perhaps better than the first embodiment. While the shield 232 is shorter than in the first embodiment, the shield 232 and gasket 238 are still clamped across the juncture of the pipe sections 21a, 21b to provide resistance to lateral movement of the pipe sections, and the axial strap 34 is believed to be stiffened by the slight stretching described above and securely held in place by the engaging projections, to provide an improved no-hub coupling assembly 220.

Moreover, the connector assembly 220 allows easy manipulation and installation of the gasket seal and an addition gripping mechanism engaging the pipe sections. A liquid seal and/or a fluid seal is established by clamping the gasket 234 to each of the pipe sections 21a, 21b using intermediate clamps 28, 30. The connector assembly 220 has the end clamps 222, 224 in position to further clamp the assembly 220 to the pipe sections themselves, without the intervening rubber or elastomeric gasket which allows better gripping of the pipe sections without needing to hold and position the end clamps while also tightening them. The ease of manipulation and installation provided by interconnecting the shield and gasket with the end clamps 222, 224 is believed to be much simpler and more efficient than prior art installations, as well as resulting in stronger and stiffer connections.

Referring to FIGS. 4A to 4F and to 6B, a fourth embodiment is shown which is like the embodiment of FIGS. 3A to 3F as the shield does not extend in the axial direction to the outer end clamps, but the fourth embodiment differs from the first and third embodiments as no engaging surface 40 or 240 or engaging projections 40 or 240 are used. The parts that are not changed from those of FIGS. 1A to 1F have the same part numbers as in FIGS. 1A to 1F, and the description, use, variations and advantages of those parts are not repeated. The parts that are changed from the parts of FIGS. 1A to 1F are incremented by 300 and unless described otherwise the parts description, use and variations of the parts are not changed and not repeated. As the end clamps are modified by having no shield and gripping projections connected to them they are assigned new part numbers 322 and 324, as are the outer ends 322a, 324a and the inner ends 322b, 324b of those end clamps.

Figure 6A:
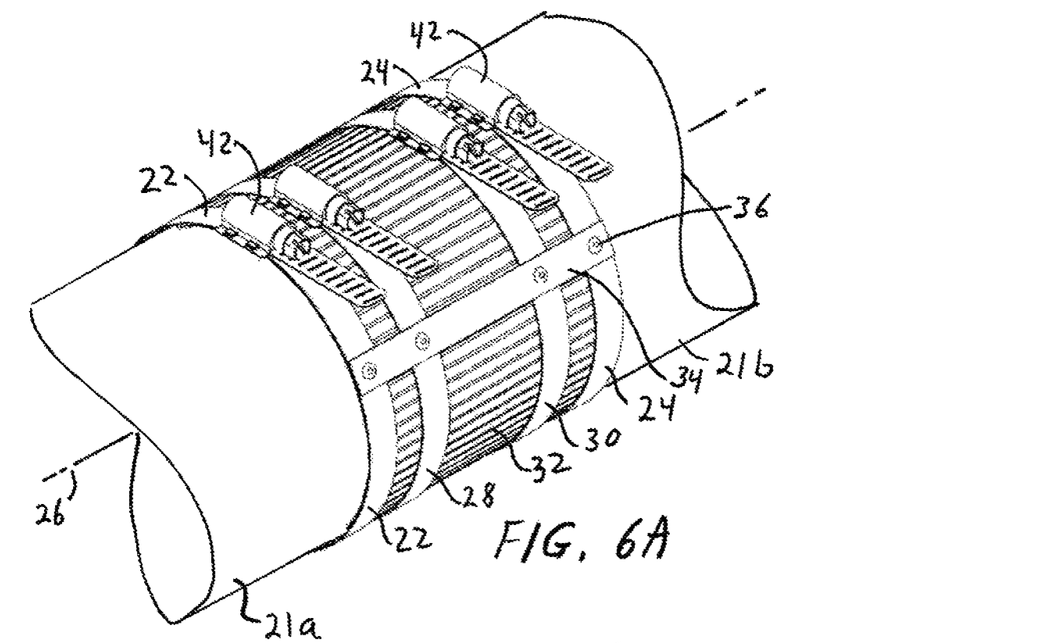
FIG. 6A is a perspective view of the coupling assembly of FIG. 1A connected to two pipe sections.
Figure 6B:
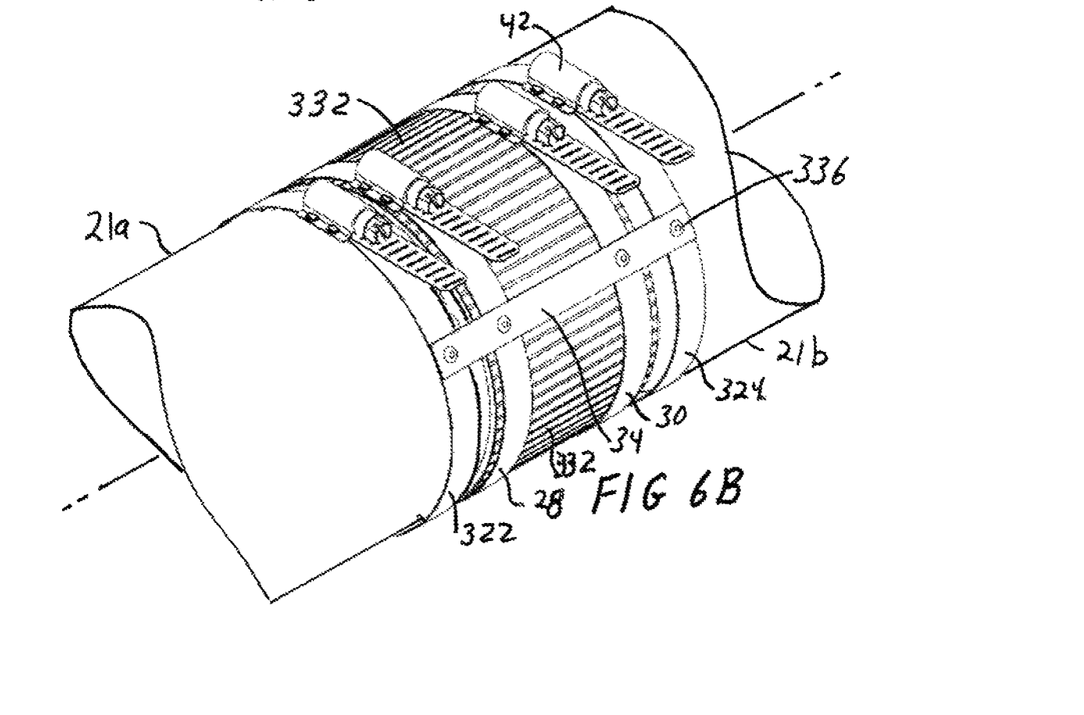
FIG. 6B is a perspective view of the coupling assembly of FIG. 4A connected to two pipe sections.

As noted, in addition to the absence of the engaging projections 40 from the shield as in the first embodiment, there is no shield interposed between the end clamps 322, 324 and the pipe sections 21a, 21b (FIG. 6B). In this fourth embodiment the shield 332 extends about the same axial distance as the gasket 238 and both have an axial end located between first and second clamps 322, 324 respectively, and the respective intermediate clamp 328, 330 adjacent to or closest to the end clamp. Thus, a first axially outer end of the shield 332 and gasket 338 ends between the first clamp 322 and adjacent intermediate clamp 328 and a second axially outer end of the shield 332 and gasket 338 ends between the second clamp 324 and its adjacent intermediate clamp 330. An axial gap or space exists between the end clamps 322, 324 and the intermediate clamp 328, 330 nearest each end clamp, and that gap or space is preferably the width of the circumferential band of the end clamps, which are preferably all the same width. But smaller or larger axial spacings can be used.

The shield 332 is advantageously adhered to the gasket 338. The fasteners 336 on the end clamps 322, 324 are similar to the fasteners 36 as previously described but do not extend radially through the shield as previously described in the third embodiment and do not connect to the shield as previously described. Thus, each end clamp 322, 324 is fastened to each axial strap 34 by fasteners 336 which extend only through the axial strap 34 and one of the clamps 322, 324. Each intermediate clamp 28, 30 is fastened to each axial strap 34 by fasteners 36 which extend through the axial strap 34, one of the clamps 28, 30 and the shield 332. If there are three axial straps 34 then each intermediate clamp 28, 30 is still fastened to the shield 332 at three, circumferentially spaced locations around the intermediate clamps, but the end clamps 322, 324 are connected to the shield 332 and intermediate clamps 28, 30 only by the axial straps 34.

The use of no-hub connector assembly 320 is as previously described for the embodiment of FIGS. 1A to 1F. Because the end clamps 322, 324 are not fastened directly to the shield 332, the end clamps may move more easily in the radial direction as the axial straps 34 flex more than if the cylindrical shield were connected to the end clamps. The straps 34 are believed to hold the end clamps in position relative to the shield 332 so that a user can easily move the coupling 320 as a single unit and position it relative to pipe sections 21a, 21b to put the ends of each pipe section at the center of the coupling.

The end clamps 322, 324 directly engage the outer surface of the pipe segments 21a, 21b as no shield 32 or 332 is interposed between the end clamps and the pipe segments. As there is no shield interposed between the end clamps and the pipe sections the end clamps are believed to form a strong and stiff connection with the pipe sections to restrain axial separation of the pipe sections 21a, 21b. The shield 332 and gasket 338 are believed to provide additional resistance to axial separation and also restrain lateral movement of the ends of the pipe sections, especially as all those parts are connected by axial straps 34.

As the shield 332 and gasket 38 end shortly after the adjacent intermediate clamps 28, 30, neither the shield nor the gasket inhibits the axial straps from bending inward toward longitudinal axis 26. It is believed that if the intermediate clamps 28, 30 adjacent the end clamps 322, 324, respectively, are tightened first, then tightening the end clamps 322, 324 is believed to slightly stretch the axial straps 34 and place the axial straps in tension as the clamp is moved toward axis 26, during tightening of the clamp. As previously described, placing the axial straps 34 in tension is believed to strength and stiffen the coupling assembly 20 and is likewise is believed to provide similar advantages to the coupling assembly 320.

This direct engagement and omission of intermediate shield is believed to provide a stronger axial connection and stiffer axial connection between the pipe segments 21a, 21b and the axial straps 34, resulting in a coupling that is believed to better resist axial separation of the pipe segments than the prior art and perhaps better than the first embodiment.

Moreover, the connector assembly 320 allows easy manipulation and installation of the gasket seal and an addition gripping mechanism engaging the pipe sections. A liquid seal and/or a fluid seal is established by clamping the gasket 238 to each of the pipe sections 21a, 21b using intermediate clamps 28, 30. The connector assembly 320 has the end clamps 322, 324 in position to further clamp the assembly 320 to the pipe sections themselves, without the intervening rubber or elastomeric gasket which allows better gripping of the pipe sections without needing to hold and position the end clamps while also tightening them. The ease of manipulation and installation provided by interconnecting the shield and gasket with the end clamps 322, 324 is believed to be much simpler and more efficient than prior art installations, as well as resulting in stronger and stiffer connections.

As required, detailed embodiments of the present invention are disclosed herein. However, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The above description is given by way of example, and not limitation. Given the above disclosure, one skilled in the art could devise variations that are within the scope and spirit of the invention, including various configurations of the ring clamps that tighten and clamp the parts of the no-hub couplings 20, 120, 220 and 320 to the pipe sections 21a, 21b. Further, the various features of this invention can be used alone, or in varying combinations with each other and are not intended to be limited to the specific combination described herein. Thus, the invention is not to be limited by the illustrated embodiments.

What is claimed is:

1. A no-hub connector for holding together first and second ends of first and second pipe sections extending along a longitudinal axis by encircling a juncture of the ends of the pipe sections with a tubular sealing gasket enclosed by a tubular metal shield, both of which extend across the juncture and are clamped to each pipe section to form a sealed pipe connection suitable for the intended use of the connector, the connector comprising:
    at least four adjustable length ring clamps, including first and second end clamps on opposing first and second ends of the connector and first and second intermediate clamps adjacent the respective first and second end clamps but axially inward of the respective first and second end clamps, each ring clamp having a clamp strap encircling the longitudinal axis and one of the pipe sections during use;
    at least two separate axial straps extending parallel to the longitudinal axis and equally spaced around that axis, each of the first and second end clamps and the first and second intermediate clamps being fastened to each of the axial straps, the shield also being fastened to each of the at least two axial straps;
    wherein the first and second intermediate clamps are spaced an axial distance apart so that the pipe juncture may be located between the first and second intermediate clamps during use and so the first and second intermediate clamps may be tightened against the first and second pipe sections, respectively, during use; and
    wherein the shield and the tubular sealing gasket have an axial length sufficient to extend to an axially outer side of the clamp straps of the first and second intermediate clamps.

2. The no-hub connector of claim 1, wherein the shield and the tubular sealing gasket do not extend axially to the first and second end clamps.

3. The no-hub connector of claim 2, wherein the intermediate clamps have a clamp strap with axial width W, and the first and second end clamps are spaced an axial distance of at least the axial width W from the respective adjacent end clamp.

4. The no-hub connector of claim 3, wherein a radially inward facing surface of the first and second end clamps have a textured gripping surface around a circumference of the end clamps.

5. The no-hub connector of claim 3, wherein a radially inward facing surface of the first and second end clamps have no textured gripping surface.

6. The no hub connector of claim 3, wherein each of the at least two axial straps are permanently fastened to the shield by one of a spot weld or a rivet.

7. The no hub connector of claim 3, wherein each location where the ring clamps are fastened to the axial strap includes a rivet having a shaft with a rivet head on opposing ends of the shaft with the shaft passing through a circumferential slot in the clamp strap so the rivet shaft can move along the slot as the length of the clamp strap changes.

8. The no-hub connector of claim 1, wherein the shield has an axial length that extends axially to the first and second end clamps and the shield is fastened to each of the axial straps at the first and second end clamps, and wherein the tubular sealing gasket does not extend axially to the first and second end clamps.

9. The no-hub connector of claim 8, wherein the intermediate clamps have a clamp strap with axial width W, and the first and second end clamps are spaced an axial distance of at least the axial width W from the respective adjacent end clamp.

10. The no-hub connector of claim 8, wherein a radially inward facing surface of the shield has a textured gripping surface extending around a circumference of the shield at least radially inward of the end clamps.

11. The no-hub connector of claim 8, wherein a radially inward facing surface of the shield has no textured gripping surface extending around a circumference of the shield at least radially inward of the end clamps.

12. The no hub connector of claim 8, wherein each of the at least two axial straps comprise at least three axial straps, each permanently fastened to the shield by one of a spot weld or a rivet.

13. The no hub connector of claim 8, wherein each location where the ring clamps are fastened to the axial strap includes a rivet having a shaft with a rivet head on opposing ends of the shaft with the shaft passing through a circumferential slot in the clamp strap so the rivet shaft can move along the slot as the length of the clamp strap changes.

14. The no-hub connector of claim 2, wherein each ring clamp comprises a worm drive tightening mechanism at one end of the clamp strap and a plurality of parallel slots at an opposing end of the clamp strap.

15. The no-hub connector of claim 8, wherein each ring clamp comprises a worm drive tightening mechanism at one end of the clamp strap and a plurality of parallel slots at an opposing end of the clamp strap.

16. The no-hub connector of claim 2, wherein there are only four ring clamps.

17. The no-hub connector of claim 8, wherein there are only four ring clamps.

18. A pipe joint using the no-hub connector of claim 2, wherein the first end clamp and first intermediate clamp are clamped to the first pipe section, and wherein the second end clamp and the second intermediate clamp are clamped to the second pipe section.

19. A pipe joint using the no-hub connector of claim 4, wherein the first end clamp and first intermediate clamp are clamped to the first pipe section, and wherein the second end clamp and the second intermediate clamp are clamped to the second pipe section.

20. A pipe joint using the no-hub connector of claim 10, wherein the first end clamp and first intermediate clamp are clamped to the first pipe section, and wherein the second end clamp and the second intermediate clamp are clamped to the second pipe section.

* * * * *